Feb. 1, 1938.　　　U. NAKAMURA　　　2,106,956
DEVICE FOR SUPPORTING STEAM PIPE LINES
Filed June 8, 1936
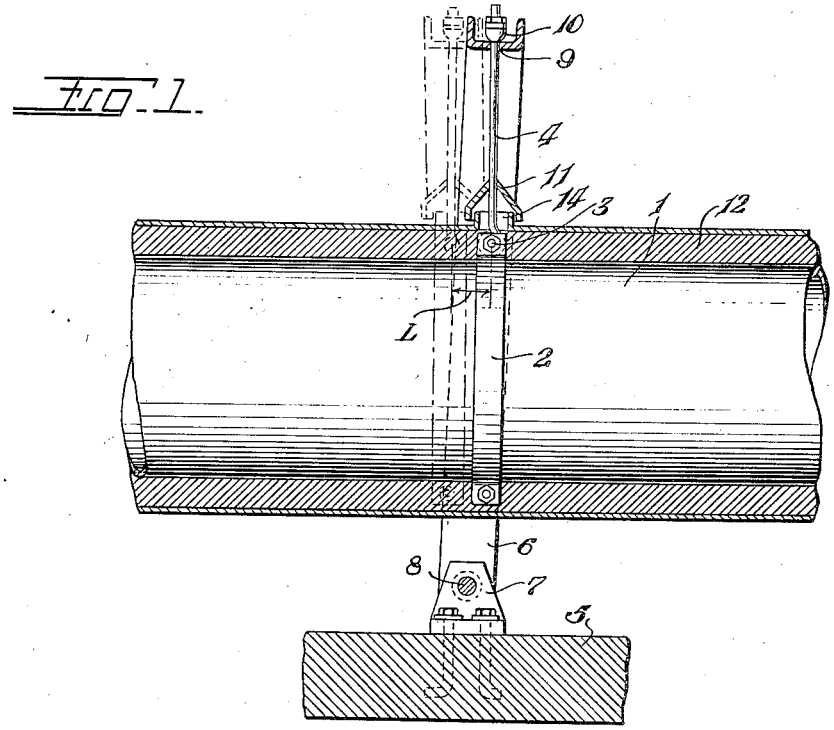
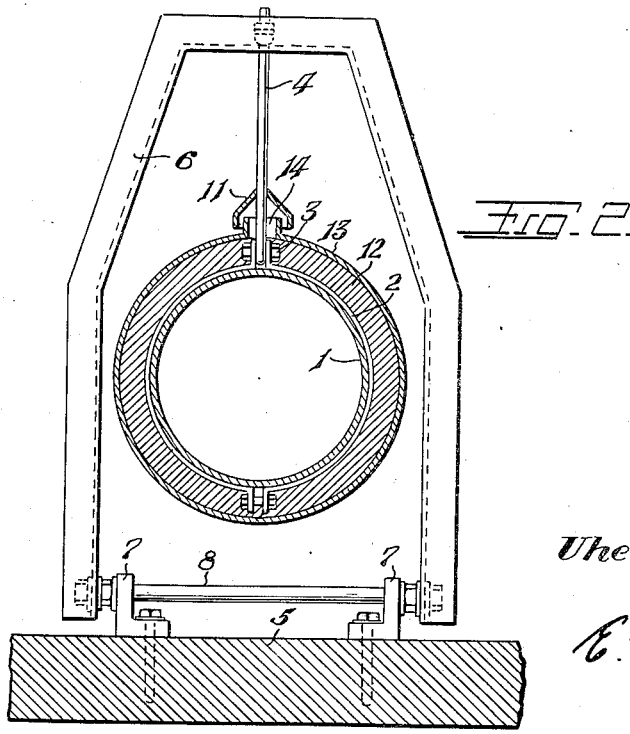
Inventor
Uhei Nakamura
Atty Patented Feb. 1, 1938

2,106,956

UNITED STATES PATENT OFFICE 2,106,956

DEVICE FOR SUPPORTING STEAM PIPE LINES

Uhei Nakamura, Minoh-mura, Osaka, Japan

Application June 8, 1936, Serial No. 84,236
In Japan June 22, 1935

4 Claims. (Cl. 248—49)

This invention relates to improvements in a device for suspension of a steam pipe line from a base, and its object is to obtain a means that the longitudinal movement of steam pipes supported by suspension rods due to expansion by heat does little affect the lateral displacement of the pipes so that an unfavorable bending of the pipe line is avoided.

A steam pipe line consisting of a series of pipes jointed in alinement is expanded and contracted due to difference of temperature, that is, whether steam is passing in the pipes or not, so that every point on the pipes longitudinally moves along the pipe line. If the pipes are held by means of rods which are suspended from a base or bracket along which the pipe line is arranged, each rod is swung in a little angle around its fixed end on the base so that the other end of the rod fixing to the pipe laterally displaces in a little distance from the original position. This of course results in a lateral displacement of the axial line of the pipes giving the pipe line an undue bending. It is obvious that the shorter the suspension rod the larger the lateral displacement of the pipe.

A steam pipe line is generally arranged in a narrow place, therefore long suspension rods are not available for holding the pipe line, so that bending of the pipe line due to temperature difference is unavoidable.

According to this invention a suspension rod for steam pipes consists of two members, one being a long frame pivotally fixed to a base, along which the pipe line is arranged, extending upwards beyond the pipe, and another member being a short rod which is connected to the pipe at its lower end and is connected to an upper part of the frame at its top end. In this case the longitudinal movement of the pipe is the same as that of the upper end of the frame. As the frame is longer than the rod, the lateral displacement of the pipe is less than the case when the pipe would be held by a suspension rod with the same length as the short rod above mentioned.

The accompanying drawing shows an example of this invention, wherein Fig. 1 is a sectional elevation of a pipe suspended from a base, and Fig. 2 is a sectional end elevation of the same.

In the drawing 1 is a pipe forming a part of a steam pipe line which is supported on the base or bracket 5. The pipe is held by means of a band 2 and the band is connected with a suspension rod 4 at its top by a bolt 3, and the suspension rod is supported on a frame 6.

This frame may be made in a reverse U shape as shown in the drawing or in a reverse J shape, and is pivotally held on the base at its foot by means of a shaft 8 fixed to the frame and its holders 7 fixed to the base. The frame extends upwards beyond the top of the pipe as long as the space allows so that a clear space is made between the pipe and the top of the frame into which space is inserted a suspension rod 4.

The rod extends through a hole 9 on the frame, and is supported thereon with a spherical surface 10 in order to ensure a free swing.

The pipe as usual is heat-insulated by a lagging 12 which is kept on the pipe by a metallic sheet 13. The metallic sheet is perforated at the portion where a suspension rod passes through. The hole 14 has a vertical flange around it, and is covered by a cap 11 fixed to the suspension rod so as to avoid entrance of foreign matters, as water into, the lagging.

When the pipe line is expanded by heat, the portion of the pipe where the latter is supported by a suspension rod, for example, the centre of the bolt 3, is moved along the pipe line through a distance L on the Figure 1. In this case, the frame 4 is forced to swing in an angle because the suspension rod 4 takes a vertical position due to its free swing, and the lateral distance of the bolt 3 from the surface of the base is changed a little. This lateral movement of the pipe necessarily makes the pipe bend, but this bend is far less than that in the case wherein the pipe would be held by a rod which is directly suspended from a base, because in the latter case the length of the suspension rod cannot be longer than the height of the available space where the pipe is arranged less the diameter of the pipe, while in this invention the frame can be as long as the height of the available space regardless of the diameter of the pipe.

What I claim is:—

1. A device for supporting a pipe line within a relatively confined space in order to prevent distortion of said pipe when expansion of said pipe occurs, comprising a supporting member below the pipe line, means pivotally mounted on said supporting member and extending upwardly beyond the pipe line, and means pivotally connected at one end to the upper end of said frame and at the other end to the pipe line.

2. A device for supporting a pipe line within a relatively confined space in order to prevent distortion of said pipe when expansion of said pipe occurs, comprising a base, and supporting means for the pipe line pivotally mounted on said base and extending substantially throughout the entire height of the space available for receiving the pipe line and its support.

3. A device for supporting a pipe line within a relatively confined space in order to prevent distortion of said pipe when expansion of said pipe occurs, comprising a base, means pivotally mounted on said base extending substantially the height of said space and pivoted supporting means for said pipe secured to the free end of said means pivotally mounted on said base whereby as said pipe expands the pivoting of said pivotally mounted means on said base will accommodate substantially the entire pipe expansion while the possibility of distortion of said pipe due to the limited arc swing of said pivoted supporting means is reduced.

4. A device for supporting a pipe line within a relatively confined space in order to prevent distortion of said pipe when expansion of said pipe occurs, comprising a base, means pivotally mounted on said base extending substantially the height of said space and supporting means for said pipe having freedom of movement and secured to the free end of said means pivotally mounted on said base whereby as said pipe expands the pivoting of said pivotally mounted means on said base will accommodate substantially the entire pipe expansion while the possibility of distortion of said pipe due to the limited arc swing of said supporting means is reduced.

UHEI NAKAMURA.